US007089268B2

(12) United States Patent  
Yoshimura et al.

(10) Patent No.: US 7,089,268 B2
(45) Date of Patent: Aug. 8, 2006

(54) DOCUMENT MANAGEMENT METHOD AND DOCUMENT MANAGEMENT SYSTEM

(75) Inventors: Mitsuhiko Yoshimura, Yokohama (JP); Noriyuki Murakami, Kyoto (JP); Yasuhiro Nanbu, Ibaraki (JP); Yuuji Kawagishi, Hirakata (JP)

(73) Assignee: Hitachi, Ltd., Tokyo (JP)

( * ) Notice: Subject to any disclaimer, the term of this patent is extended or adjusted under 35 U.S.C. 154(b) by 335 days.

(21) Appl. No.: 10/141,985

(22) Filed: May 10, 2002

(65) Prior Publication Data

US 2002/0169753 A1 Nov. 14, 2002

(30) Foreign Application Priority Data

May 14, 2001 (JP) .............................. 2001-142560

(51) Int. Cl.
*G06F 17/30* (2006.01)

(52) U.S. Cl. ...................... 707/201; 707/101; 707/205; 715/500.1; 715/505; 715/511

(58) Field of Classification Search ........ 707/200–205; 715/513–516, 500–504
See application file for complete search history.

(56) References Cited

U.S. PATENT DOCUMENTS

| 5,623,655 | A | | 4/1997 | Chisaka | |
|---|---|---|---|---|---|
| 5,625,810 | A | * | 4/1997 | Kurosu et al. | .................. 707/1 |
| 5,752,250 | A | * | 5/1998 | Minatogawa et al. | ....... 707/200 |
| 6,088,707 | A | | 7/2000 | Bates et al. | |
| 6,092,091 | A | * | 7/2000 | Sumita et al. | .............. 715/530 |
| 6,185,563 | B1 | | 2/2001 | Hino | |
| 6,226,645 | B1 | * | 5/2001 | Bae et al. | ..................... 707/10 |
| 6,631,496 | B1 | * | 10/2003 | Li et al. | .................. 715/501.1 |

FOREIGN PATENT DOCUMENTS

| EP | 0 987 636 A2 | 3/2000 |
|---|---|---|
| JP | A-11-15716 | 5/1989 |
| JP | A-10-222534 | 8/1998 |
| JP | A-10-269071 | 10/1998 |
| JP | A-10-302014 | 11/1998 |

OTHER PUBLICATIONS

Sarin, et al. "A Process Model and System for Supporting Collaborative Work", Xerox Advanced Information Technology, 1991.

* cited by examiner

Primary Examiner—Jean M. Corrielus
Assistant Examiner—Isaac Woo
(74) Attorney, Agent, or Firm—Mattingly, Stanger, Malur & Brundidge, P.C.

(57) ABSTRACT

A document management system of managing as inter-document relation information a plurality of keywords collected as a set for each document template type and managing link among said keywords includes the document file entry and update steps of selecting at least one of keywords based on a document template type in the inter-document relation information; linking the selected keyword with the document file; and detecting a document file influenced by the document entry and update by using the link between the selected keyword and the document file and the inter-document relation information.

8 Claims, 12 Drawing Sheets

FIG.4

UPDATED DOCUMENT INFORMATION 410

| KE_ID (411) | DOCUMENT TEMPLATE TYPE (412) | DOCUMENT NAME (413) | USER NAME (414) | ENTRY DATE AND TIME (415) | KEYWORD (416) | REASON(S) OF UPDATE (417) |
|---|---|---|---|---|---|---|
| 1 | PROJECT POLICY DOCUMENT | PJ.doc | User1 | H13/1/1 | SCHEDULE | RELEASE PERIOD EXTENSION |
| 2 | PROJECT POLICY DOCUMENT | PJ.doc | User1 | H13/1/1 | GUI DEVELOPMENT POLICY | GUI PROJECTIONS UPDATE |
| 3 | DB ANALYSIS MODEL DOCUMENT | DB.doc | User2 | H13/1/1 | TABLE DESIGN | TABLE ADDITION |
| 4 | GUI SPECIFICATION | GUI.doc | User3 | H13/1/1 | SCHEDULE | PJ POLICY UPDATE |

INFLUENCED DOCUMENT INFORMATION 420

| IKE_ID (421) | INFLUENCED DOCUMENT TEMPLATE TYPE (422) | INFLUENCED DOCUMENT NAME (423) | INFLUENCED USER NAME (424) | INFLUENCED KEYWORD (425) | UPDATED KW_ID (426) |
|---|---|---|---|---|---|
| 1 | DB ANALYSIS MODEL DOCUMENT | DB.doc | User2 | SCHEDULE | 1 |
| 2 | GUI SPECIFICATION | GUI.doc | User3 | SCHEDULE | 1 |
| 3 | GUI SPECIFICATION | GUI.doc | User3 | GUI DEVELOPMENT POLICY | 2 |

DOCUMENT UPDATE NOTICE INFORMATION 140

FIG.6

DOCUMENT UPDATE NOTICE SCREEN — 190

| 191 | 192 |
|---|---|
| DOCUMENT ENTRY AND UPDATE   DOWNLOAD | DEFINITION INFORMATION, ENTRY |

DUPDATE-INFLUENCED STATUS                    193

| ENTRY DOCUMENT NAME | UPDATE FLAG | UPDATE-INFLUENCED CASE NUMBER | |
|---|---|---|---|
| GUI.doc | ○ | 2 | |
| GUI2.doc | × | 0 | |
|  |  |  | |
|  |  |  | |

196

LIST OF UPDATED DOCUMENTS AND KEYWORDS         194

| UPDATED DOCUMENT NAME | KEYWORD | REASON(S) OF UPDATE | INFLUENCED KEYWORD |
|---|---|---|---|
| PJ.doc | SCHEDULE | RELEASE PERIOD EXTENSION | SCHEDULE |
| PJ.doc | GUI DEVELOPMENT POLICY | GUI PROJECTIONS UPDATE | GUI DEVELOPMENT POLICY |
|  |  |  |  |
|  |  |  |  |

195 — END

FIG.12

DOCUMENT ENTRY SCREEN — 1150

| | |
|---|---|
| DOCUMENT FILE NAME | PJ.doc — 1151 |
| DOCUMENT TEMPLATE TYPE | PROJECT DEVELOPMENT DOCUMENT ▼ — 1152 |
| LIST OF KEYWORDS | LIST OF PRODUCT NAMES ▼ — 1153 |

LIST OF DOCUMENT TEMPLATE TYPE KEYWORDS — 1154

SCHEDULE
DB DESIGN POLICY
GUI DESIGN POLICY

>
<

LIST OF FILE SELECTION KEYWORDS — 1155

SCHEDULE
GUI DESIGN POLICY

LIST OF UPDATED KEYWORDS — 1156

| KEYWORD LIST NAME | KEYWORD | REASON(S) OF UPDATE |
|---|---|---|
| PRODUCT LIST | ABC | |
| SECTION LIST | SCHEDULE | RELEASE PERIOD EXTENSION |
| SECTION LIST | GUI DEVELOPMENT POLICY | GUI PROJECTIONS UPDATE |
| | | |

| | |
|---|---|
| UPDATE NOTICE CONDITION | PRODUCT LIST AND SECTION LIST — 1157 |

CANCEL — 1158          1159 — ENTER

DOCUMENT MANAGEMENT METHOD AND DOCUMENT MANAGEMENT SYSTEM

BACKGROUND OF THE INVENTION

The present invention relates to a document-update notice included in the document management technology.

There have been proposed the following conventional document management systems. The JP-A-10-269071 has stated that the update of a common document element is noticed to a user of a compound document if the document element is shared in the compound document.

Further, the JP-A-10-222534 has stated the system of noticing the update based on the relation among documents with analogous words. The JP-A-10-302014 has stated that the system of managing a user's document inspecting history as log information and providing a user who inspects the documents with a document-update notice if the document is updated.

The JP-A-11-15716 has stated the system of providing a client side with a document-update notice when a document managed on a Web server is updated. The U.S. Pat. No. 5,623,655 has stated the system of providing a user who refers to a common document with a document-update notice through an electronic mail or the like if the common document is updated.

The U.S. Pat. No. 6,088,707 has stated the system of noticing the update of the document managed on the Web server and displaying a list of updated sites and their updated contents.

Moreover, there has known a system of pre-creating a template document with the document relations defined on a document component element unit by using a structured document description language such as Standard Generalized Markup Language (SGML) and eXtensible Markup Language (XML) and managing a document on the foregoing template document.

In developing a new product in the fields of software and medicine, for carrying out a project of developing a new product, a plurality of workers may create many kinds of documents. For example, when developing a new product, a worker A creates a "project document" concerning a policy of an overall project and the other workers B and C create their own "subtask documents" for each subtask based on the "project document". The "project document" created by the worker A includes the overall schedule and the like. The worker B creates the "subtask document" as referring to the "project document". When the worker A changes the overall schedule in the "project document", the worker B changes the "subtask document" based on the updated content of the "project document". As described above, in a case that a plurality of workers creates the documents in concert, as the sorts of the created documents and the relation among the created documents are made sophisticated, one worker may forget a document-update notice to the other workers. As this result, the other workers perform the work based on the document of the previous version, which leads to the unnecessary work of creating a document. That is, since the document-update notice is not correctly given, the recreation of the document in the work of creating the document is made necessary.

The document-update notice of the prior art does not involve how the proper document-update notice is given to each worker. In a case of managing the foregoing "project document" in the conventional system, the creator of the project document and the user who constantly refers to it may accept the document-update notice. However, the document-update notice does not reach the creators of the subtask documents except the creator of the "project document". It means that such a creator of the subtask documents has to check the updated status of the document located out of his territory as being conscious of the documents related with his document. It means that lots of time and efforts and working steps are required for checking the state of the document located out of the creator's charge. No aiding function of easily checking the updated state of the related document has been prepared as a system function. Hence, the recreation of the document may disadvantageously take place in the work of creating the document.

SUMMARY OF THE INVENTION

It is an object of the present invention to provide a document management method and system which are arranged to retrieve the document to be influenced by the update of another document without fail if any document update takes place.

The document management method and system according to the present invention are arranged as follows.

According to a first aspect of the invention, a document management system of managing as inter-document relation information a plurality of keywords collected as a set for each document template type and managing a linking relation among the keywords includes the steps of selecting at least one keyword based on the document template type in the inter-document relation information as a process of registering and updating a document file; linking the selected keyword with the document file; and detecting a document file to be influenced by the document entry and update by using the link between the selected keyword and the document file and the inter-document relation information.

According to a second aspect of the invention, a document management method includes the steps of classifying the documents into each influenced document file and displaying on screen the number and the state of the influenced document files and the updated document files; and displaying the detailed information such as a keyword to be updated in the updated document file and the reason(s) of the update in the aforementioned detecting step.

According to a third aspect of the invention, a document management method includes the steps of managing as the foregoing inter-document relation information a time sequence section of the progressing status of the document creation as a plurality of document creating stages and managing each of said document creating states and the document template type as linking them with each other; and, in the said detecting step, changing the range of the document template type to be given a document-update notice according to each document creating state.

According to a fourth aspect of the invention, a document managing method includes the steps of managing as said inter-document relation information the document template types and the keywords as the keyword conversion information in the linking manner; and, in said detecting step, detecting the link among the keywords by using the keyword conversion information.

According to a fifth aspect of the invention, a document managing method includes the step of relating a tag name held inside of a structured document file and the keyword in said step of linking the selected keyword with the selected keyword.

According to a sixth aspect of the invention, a document management method further includes the step of transmitting a message having a document file name to be influenced by an electronic mail.

According to a seventh aspect of the invention, a document management method includes the step of linking the document files with a list of a plurality of keywords in the step of linking the selected keyword with the document file.

According to an eighth aspect of the invention, a document management method includes the steps of holding a user who is to be provided with an entry or update notice of a stored document and a keyword for another user who tries to enter or update said document as linking said user with said keyword; prompting said another user to retrieve said keyword based on the retrieval condition set when said another user updated said document; and noticing a document update to said user who is to be provided with said document update.

According to a ninth aspect of the invention, a document management system includes a first processing unit of holding a user who is to be provided with an entry or update notice of a stored document and a keyword for another user who tries to enter or update said document as linking said user with said keyword; a second processing unit of prompting said another user to retrieve said keyword based on the retrieval condition set when said another user updated said document; and a third processing unit of noticing a document update to said user who is to be provided with said document update.

According to a tenth aspect of the invention, a document management program includes a processing program of a first processing program of holding a user who is to be provided with an entry or update notice of a stored document and a keyword for another user who tries to enter or update said document as linking said user with said keyword; a second processing program of prompting said another user to retrieve said keyword based on the retrieval condition set when said another user updated said document; and a third processing program of noticing a document update to said user who is to be provided with said document update.

According to an eleventh aspect of the invention, a computer-readable recording medium includes a first code unit of holding a user who is to be provided with an entry or update notice of a stored document and a keyword for another user who tries to enter or update said document as linking said user with said keyword; a second code unit of prompting said another user to retrieve said keyword based on the retrieval condition set when said another user updated said document; and a third code unit of noticing a document update to said user who is to be provided with said document update.

BRIEF DESCRIPTION OF THE DRAWINGS

FIG. 4 is a table view showing user information and document-update notice information of the first embodiment of the invention;

FIG. 6 is a view showing a document-update notice in the first embodiment of the invention;

FIG. 12 is a view showing a screen on which a document is entered in the sixth embodiment of the invention.

DESCRIPTION OF THE EMBODIMENTS

Figure 2:
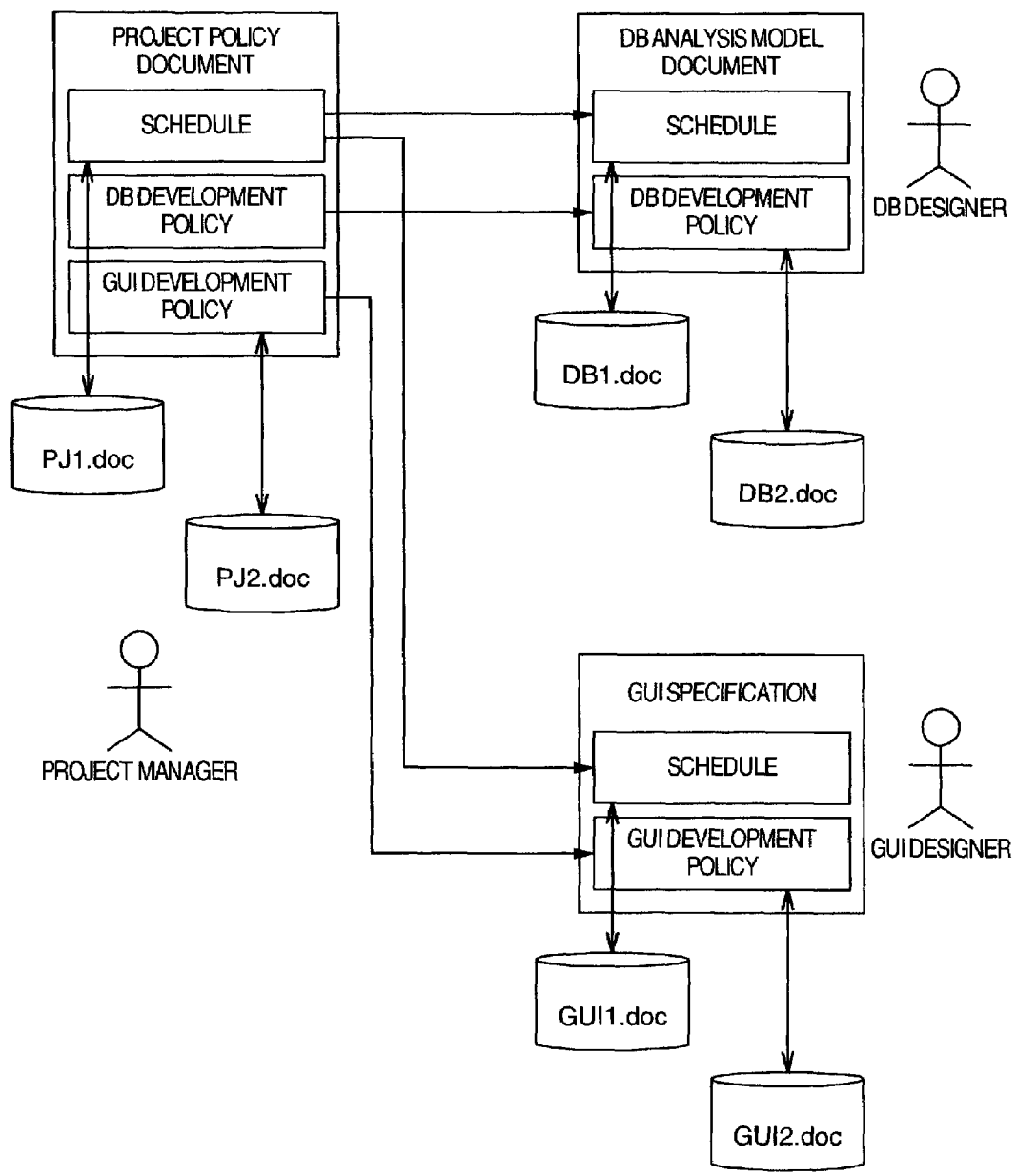
FIG. 2 is an schematic explanatory view showing an arrangement of the first embodiment of the invention.

The schematic arrangement of the invention will be described with reference to FIG. 2. The following description will be expanded on the work of creating a "DB analysis model document" and a "GUI specification" as referring to a "project policy document".

According to the present invention, the processing operation is executed to pre-enter a list of keywords required for each document and define linking relation for an update notice among these keywords. In FIG. 2, the keywords contained in the "project policy document", the "DB analysis model document" and the "GUI specification" are linked with each other by means of the link information for defining the orientation of the update notice.

Then, consider the case that the project manager updates a document file PJ2.doc concerning the GUI development policy. The project manager links the document file PJ2.doc containing the updated content with the keyword "GUI development policy". Then, on the system side, the update notice information for noticing the update is generated inside the system by tracing the relation among the keywords. Each user can get to know which of the documents being referenced is updated through the update notice information generated on the system. In the exemplary arrangement in FIG. 2, the update of the GUI development policy is noticed only to the GUI designer. The person in charge enables to accept the update notice of the document that gives an influence to the document in charge merely by referring to the document in charge. On the other hand, the update of the GUI development policy is not influenced to the DB analysis model document. Hence, no document-update notice is transmitted to the DB designer.

According to the invention, the processing operation is executed to notice the document update by using the link between the document file and the keyword without having to update the document file and analyzing the document file. Hence, if the document file format is not the same among the document creators, the update notice is enabled.

Moreover, according to the invention, the document-update notice is not concurrently transmitted to all the persons. It is transmitted only to the document creator to be influenced by the document update.

Figure 1:
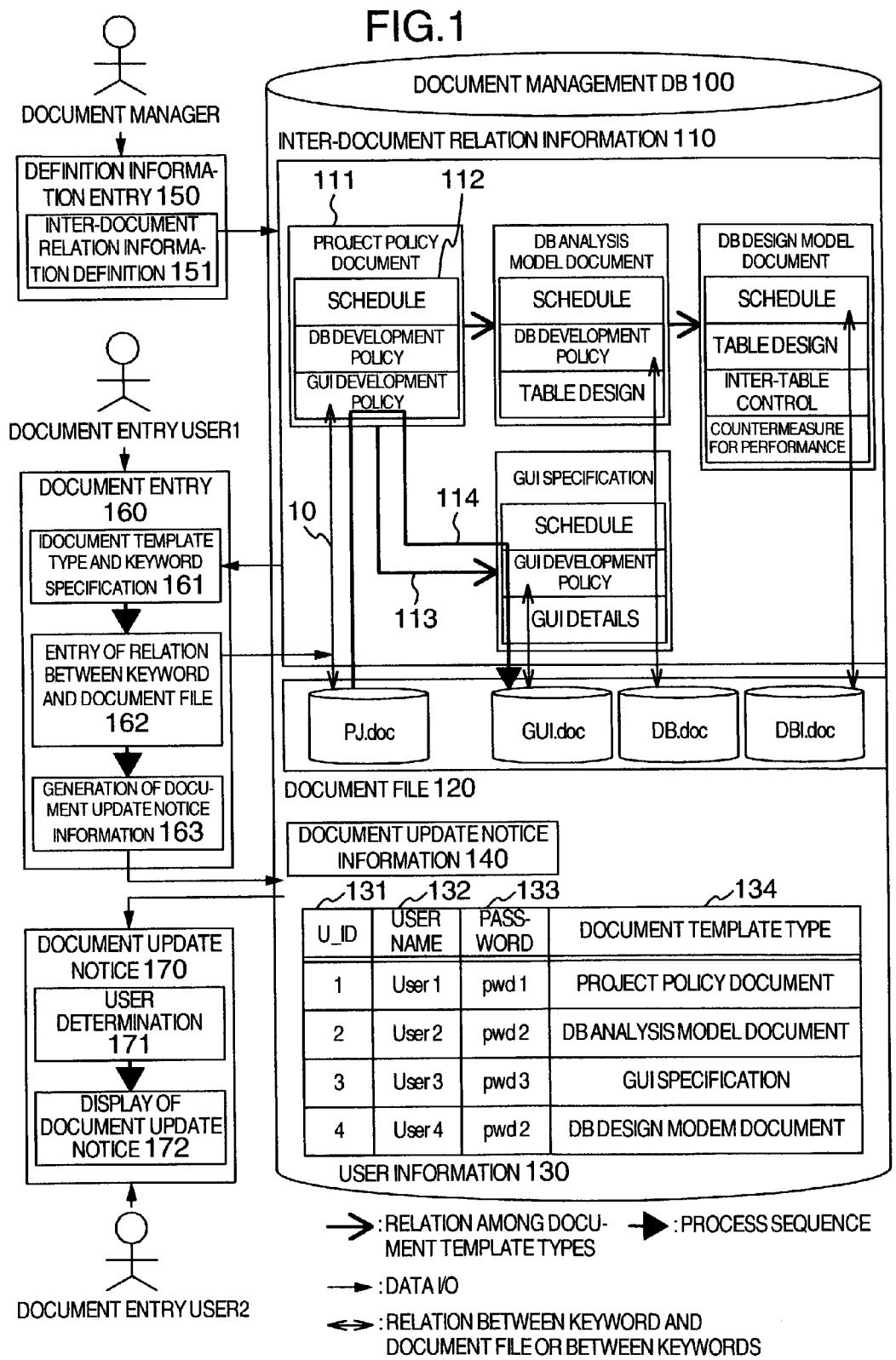
FIG. 1 is a diagram showing a processing operation of the first embodiment of the invention.

One embodiment (first embodiment) of the invention is illustrated in FIG. 1. In FIG. 1, a bold arrow "→" indicates a relation between the document template types, a bold another arrow "→" indicates a processing sequence, an arrow "→" indicates a data I/O, an arrow "↔" indicates a relation between the keyword and the document file and between the keywords. This holds true to the other figures.

In this invention, at first, a document management database (abbreviated as DB) 100 manages inter-document relation information 110. The inter-document relation information 110 is made up of a document template type 111, a keyword 112, and a relation 113 between the document template types. The inter-document relation information 110 indicates the reference relation concerning the document update. The document template type 111 represents the document template type to be treated in the work. In FIG. 1, as an example of a document template type, the "project policy document", the "DB analysis model document", and the "DB design model document" may be referred.

The keyword 112 is used for defining each document template type. As shown in FIG. 1, each document template type 111 holds a list of the keywords required for each document template type. This keyword registers a title of a chapter and a clause required for each document template type as a keyword list. For example, the document template type "project policy document" shown in FIG. 1 registers the "schedule", the "DB development policy" and the "GUI development policy" as a keyword list. Likewise, another document template type such as the "DB analysis model document", the "GUI specification" or the "DB design model document" holds the keywords.

The relation 113 among the document template types is a relation for indicating "which of the documents to be referenced for creating the next document" to the aforementioned document template types. In the example shown in FIG. 1, the relation 113 among the document template types uses an arrow for relating the "project policy document" with the "GUI specification". This indicates the creation of the "GUI specification" by referring to the content of the "project policy document". Then, the foregoing keyword 112 is permitted to define the linking relation between the keywords only between the document template types having the relation 113 of the document reference defined thereto. For example, in FIG. 1, the "project policy document" is related with the "GUI specification" by means of the relation 113 of the document reference. This means that the update notice is given to the keyword "schedule" of the "GUI specification" in the case that the keyword "schedule" of the "project policy document" is updated.

The summary of the process according to the invention will be described on the basis of the inter-document relation information 110. With reference to FIG. 1, the description will be oriented to the exemplary process between a document entry user 1 and a document entry user 2.

Figure 5:
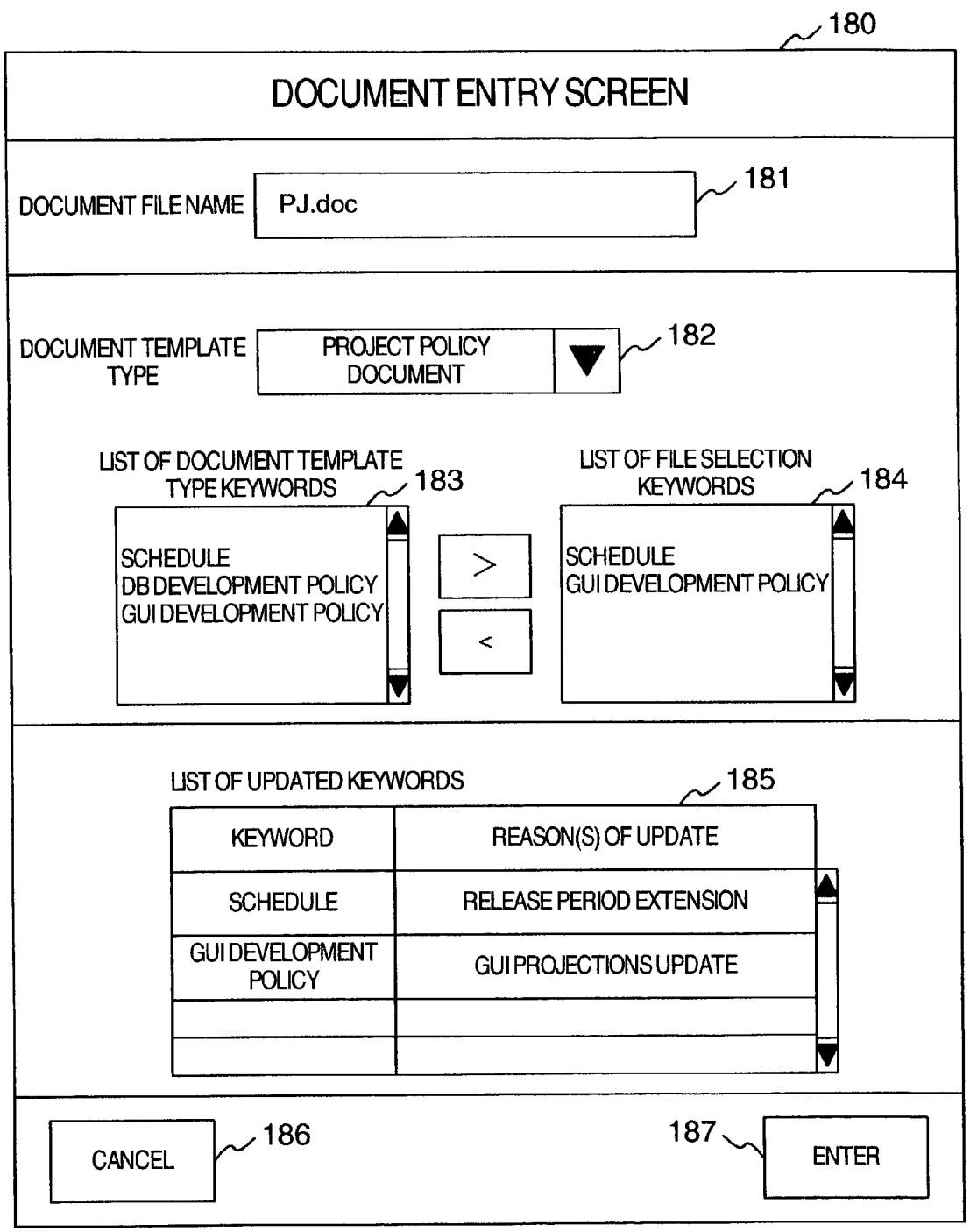
FIG. 5 is a view showing a screen on which a document is to be entered in the first embodiment of the invention.

At first, the document entry user 1 operates to enter the document file "PJ.doc". In the entry is used the document update screen shown in FIG. 5. On the document entry and update screen 180, at first, the document template type name 182 for the document file is selected. In this case, the document template type "project policy document" is selected. Then, on the document template type keyword list 183 of the document entry screen 180, the list of the keyword for the document template type to be entered is displayed. In the example shown in FIG. 5 are displayed the schedule, the DB development policy and the GUI development policy defined as the keyword of the project policy document. The document entry user 1 selects the necessary keyword from the document entry screen 180. For example, the GUI development policy is selected. Then, this selected item is displayed in the updated keyword list 185. When this updated keyword is entered, on the system side, as shown in FIG. 1, the document file "PJ.doc" is related with the keyword "GUI development policy" and then the relation is entered on the system. This relation is called the "relation 10 between the keyword and the document file". In FIG. 1, this relation is indicated as the "relation 10 between the keyword and the document file".

Then, as is obvious from FIG. 1, PJ.doc is indirectly linked with GUI.doc through the inter-document relation information 110. On the system side, by tracing the linking relation managed by the inter-document relation information 110, the linked document GUI.doc can be detected. In FIG. 1, the flow of the linking relation tracing on the system side is indicated by the real line 114. The document-updated result detected inside the system is temporarily held as the document-update notice information 140. In the following description, the document file from which the update takes place is called a updated document file. The document file detected by tracing the linking relation indicated by the real line 114, that is, the document file to be influenced by the changing process is called an influenced document file.

Next, the document entry user 2 logs in the document management system. Then, the system is served to authenticate the user and detect the document template type of which the user is in charge through the use of the user information 130. In succession, the system is served to detect the document update information for the user who loges in the system and notice the information by referring to the document-update notice information 140. FIG. 6 shows the document-update notice screen 190. On this screen is displayed the update notice information for the document entered by each user. On the document-update notice screen 190 shown in FIG. 6, the document entry user 2 gets to know the update is executed to have an influence on his or her own document GUI.doc. On the document-update notice screen 190 shown in FIG. 6, when the entered document name GUI.doc indicated by 196 is selected by a mouse or the like, the detailed information such as the reason(s) of update and the keyword of the updated document PJ.doc is displayed on the "updated document and keyword list 194".

In turn, the description will be oriented to the user information 130 and the document-update notice information 140 shown in FIG. 1. As shown in FIG. 1, the user information 130 is made up of an identifier U_ID 131, a user name 132, a password 133, and a document template type 134. The document template type name 134 stores the template type name of the document of which each user is in charge.

As shown in FIG. 4, the document-update notice information 140 is made up of a updated document information 410 and an influenced document information 420. The updated document information 410 stores the management information for the updated document file. The updated document information 410 is made up of an identifier KW_ID 411, a document template type 412, a document name 413, a user name 414, an entry date 415, a keyword 416, and a reason(s) of update 417. The value of the user name 414 is contained in the user name 132. The keyword 416 stores the keyword selected by the document entry user in linkage with the content updated on the document file. The reason of update 417 stores a comment for describing "why and how the modification is executed?" for the keyword 416.

The influenced document information 420 stores the management information for the document to be influenced by the updated document. The influenced document information 420 is made up of an identifier IKW_ID 421, an influenced document template type 422, an influenced document name 423, an influenced user name 424, an influenced keyword 425, and an updated KW_ID 426. The influenced document template type 422, the influenced document name 423, the influenced user name 424, and the influenced keyword 425 store the document template type of the influenced document, the document name, the user name and the keyword, respectively. The updated KW_ID 426 stores KW_ID 411 for specifying the information of the updated document file from the updated document information 410.

Figure 3:
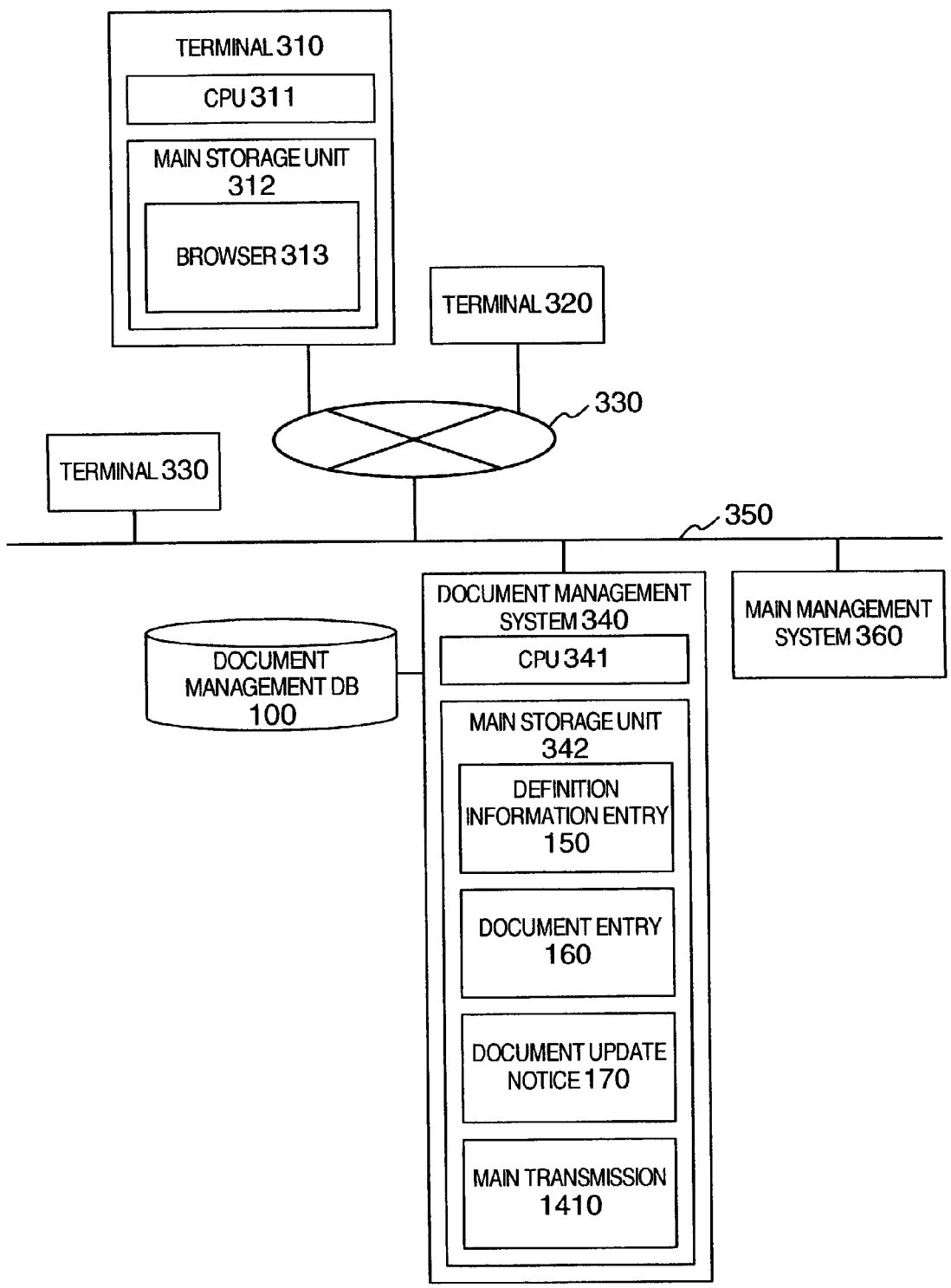
FIG. 3 is a diagram showing a system of the first embodiment.

In turn, the description will be oriented to the detailed process for realizing the present invention. The system arrangement of the present invention is illustrated in FIG. 3. In FIG. 3 are shown the document management system 340, the terminals 310, 320 and 330, and the document management DB 100. The document management system 340 is connected with the terminals through the network like the local area network (LAN) 350 or the Internet 330. Though partially eliminated in FIG. 3, the document management system 340 and the terminals 310, 320 and 330 provide the CPU, the storage unit and the input unit like a mouse and a keyboard, respectively, which are included in the ordinary computer.

The document management DB 100 holds the inter-document relation information 110, the document file 120, the document-update notice information 140, and the user information 130 as shown in FIG. 1. The main storage unit 342 included in the document management system 340 stores a program of executing a definition information entry process 150, a document entry process 160, a document-update notice process 170, a mail transmit process 1410 and so forth. The main storage unit 312 of the terminal 310 stores a browser 313 by which an application to be run on the document management system 340 is to be used. The use of this browser makes it possible for the terminal side to handle a series of functions to be discussed below.

Of course, the arrangement shown in FIG. 3 is exemplary. According to the invention, the existing technology is used for the network configuration or the protocol. Hence, it is not limited to the arrangement shown in FIG. 3. The network shown in FIG. 3 is not limited to the LAN but also another network system. The server arrangement may be realized by the properly addition of a Web server and a gateway server to the shown arrangement. Further, the content of the present invention may be realized by the application software based on the Web. The processing location of the document management system and the terminal is not limited to that shown in FIG. 3. For example, the arrangement wherein all the processes are located on the terminal side may be considered as another arrangement rather than that shown in FIG. 3. This may be realized merely by changing the module location of the software and thus does not substantially have an influence on the content of the invention.

Hereafter, each process will be described in detail with reference to the appended drawings. At first, the main processing flow of the invention will be described with reference to FIG. 7. In step 701, the process is executed to display a log-in screen of the system. On this log-in screen, the user may enter a user name and a password. In step 702, the process is executed to determine if the user name and the password entered by the user are located on the user information 130 shown in FIG. 1. If it is located, the process of step 703 is executed, while if it is not, the system is terminated.

In step 703, the corresponding document template type to the log-in user is obtained from the user information 130 shown in FIG. 1.

In step 704, the process is executed to open the document-update notice screen 190 shown in FIG. 6.

In step 705, the document-update notice process 170 is executed, which will be discussed below.

In step 706, the process is executed to determine if the "definition information entry 192" on the menu of the document-update notice screen 190 shown in FIG. 6 is selected.

In step 707, the definition information entry process 150 is executed, which will be discussed below.

In step 708, the process is executed to determine if the "document entry and update 191" on the menu of the document-update notice screen 190 shown in FIG. 6 is selected.

In step 709, the document entry process 160 is executed, which will be described with reference to the flow of FIG. 8.

In step 710, the process is executed to determine if the button "end 195" of the document-update notice screen 190 shown in FIG. 6 is selected.

Figure 7:
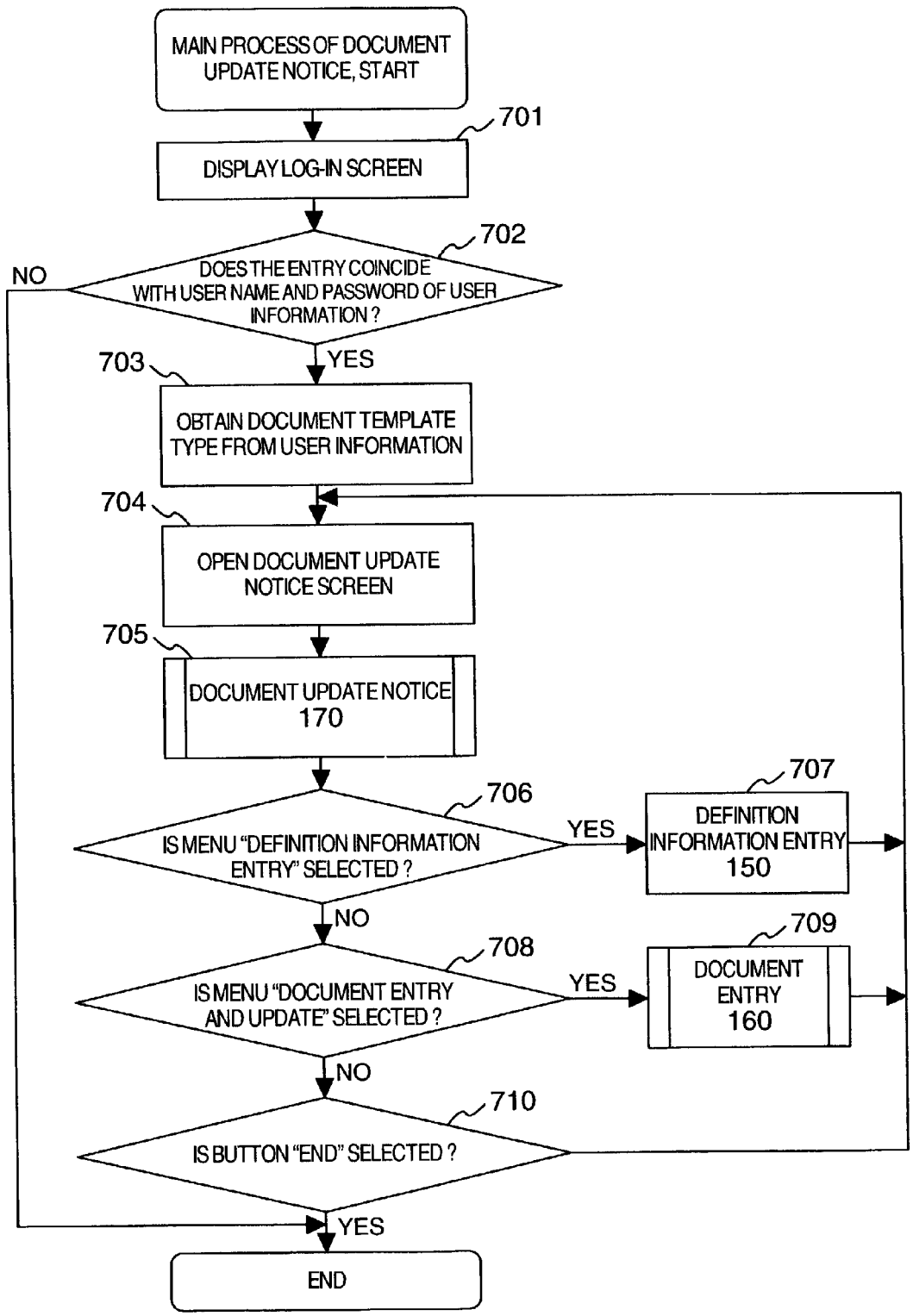
FIG. 7 is a flowchart showing a main process of a document-update notice in the first embodiment of the invention.

In the following, the supplementary explanation of FIG. 7 will be expanded. In the flow of FIG. 7, after the user logs in the system, the document-update notice screen 190 shown in FIG. 6 is displayed (step 704). As shown in FIG. 6, the items "definition information 192" and "document entry and update 191" are found on the menu of the document-update notice screen 190. By selecting these menu items, it is possible to execute the definition information entry process 150 (step 707) and the document entry process 160 (step 709).

In the sequence of the operation screen, as shown in step 704 of FIG. 7, the update notice screen 190 shown in FIG. 6 is displayed at first. However, in the working sequence immediately after the system set-up, at first, the definition information is entered and then the document entry process is executed. Lastly, the document-update notice is executed. The following description will be expanded along the working schedule. At first, the description will be oriented to the step 707 of the "definition information entry process 150" of FIG. 7 and then the step 709 of the "document entry process 160".

In the document management system, when the entry document is updated, it is necessary to provide a function of downloading a document file from the document management system 340 to the terminals 310, 320 and 330. In this embodiment, the download function of the document file is realized by the prior art. Hence, the function is not described in detail here.

In turn, the description will be oriented to the "definition information entry process 150" of step 707 in FIG. 7. As shown in FIG. 1, this process is executed to define the inter-document relation information 151.

As stated above, after the user logs in the system, the user selects the "definition information entry" 192 from the menu of the document-update notice screen 190. In this case, the "definition information entry process 150" shown in FIG. 1 is executed. This process is executed to graphically display the inter-document relation information 110 shown in FIG. 1 on the screen. By handling the mouse or the keyboard on the screen, the user may add a new keyword for each document template type or handle the relation between the document template types. Then, the linked information with this is managed on the present system. Further, the user information 130 is entered as linking the user with the document template type. When the "definition information entry process 150" is terminated, the process goes back to the document-update notice screen 190 shown in FIG. 6.

In turn, the description will be oriented to the "document entry process 160" of step 709 in FIG. 7. As shown in FIG. 1, this process covers a series of processes 161 to 163.

The process of the document template type and keyword specification 161 is executed to display the document entry screen 180 shown in FIG. 5 on which the user specifies the document template type and the keyword. Herein, on the document entry screen 180 shown in FIG. 5, the user specifies and enters the necessary value. At first, on the document entry screen 180 shown in FIG. 5, the user specifies the document file name 181 and the document template type 182. On the system, the keyword linked with the document template type is displayed. As shown in FIG. 5, the list of the keywords linked with the document template type of the entered document file is displayed on the list 183 of the keywords for each document template type. On the document entry screen shown in FIG. 5 are displayed the schedule, the DB development policy and the screen development policy defined as the keyword of the project policy document. The document entry user 1 selects the necessary keyword from the document entry screen 180. For example, the "screen development policy" is selected. Then, the system is served to display this selected item in the updated keyword list 185. Then, the reason(s) of the update is entered to the "reason(s) of update" shown on the update keyword list 185 shown in FIG. 5. Herein, only in a case that the user presses the entry 187 of FIG. 5, the processes 162 and 163 are executed. In a case that the user presses a cancel 186, the document entry process 160 is immediately terminated.

The process of the relation entry 162 of the keyword with the document file is executed to enter the relation of the keyword with the document file. FIG. 1 shows the relation 10 of the keyword with the document file, which is entered on the document management DB 100.

The generation 163 of the document-update notice information is executed to generate the document-update notice information 140. The details of this process will be described in each substep.

In first substep, the process is executed to obtain the linked document template type and keyword from the inter-document relation information 110 based on the condition of the document template type, the document file name and the updated keyword values entered on the document entry screen 180 of FIG. 5. For example, the process is executed to obtain the keyword "GUI development policy" in the "project policy document" from the inter-document relation information 110 shown in FIG. 1.

In second substep, the process is executed to obtain from the inter-document relation information the document template type and the keyword that meet the retrieval conditions of the relation of the document template type with the document obtained in the first step and the same keyword as the updated keyword. For example, in the arrangement shown in FIG. 1, assuming that the document template type "project policy document" and the keyword "GUI development policy" are the retrieval conditions, the document template type "GUI specification" and the keyword "GUI development policy" are obtained as the retrieved results.

In third substep, the process is executed to detect the document file name linked with the document template type and keyword obtained in the second substep by referring to the relation of the keyword with the document file. For example, in the arrangement shown in FIG. 1, the "relation 10 of the keyword with the document file" makes the keyword "GUI development policy" of the document template type "GUI specification" link with the document file "GUI.doc". Hence, in this arrangement, the document file "GUI.doc" is obtained as the detected results.

In fourth substep, the document template type and the keyword obtained in the second substep and the document file name obtained in the third substep are entered in the influenced document information 420 of FIG. 4. For example, on the foregoing exemplary arrangement, the record information indicated as IKW_ID =3 is entered in the influenced document information 420 shown in FIG. 4.

In turn, the description will be oriented to the "document-update notice process 170" in step 705 of FIG. 7. This process is executed to show the content based on the document-update notice information on the document-update notice screen 190 of FIG. 6. As shown in FIG. 1, the document-update notice process 170 is made up of a user determination 171 and a document-update notice information display 172.

The user determination 171 is executed to obtain only the influenced document information 420 related with the user who logged in the system by using the log-in user name as the narrowing condition to the influenced keyword of the influenced document information 420.

The process of the document-update notice information display 172 is executed to display the document-update notice screen 190 of FIG. 6 based on the information obtained by the user determination 171. Then, the GUI control process is executed according to the user's operation. For example, when the user selects the item indicated by 196 on the update-influenced status 193, the detailed information linked with the selected content is displayed on the "updated document and keyword list 194". In the display process, the system is served to narrow the influenced document information 420 based on the user name and the entered document name of the update-influenced status 193 and display this narrowed result on the "updated document and keyword list 194". Herein, the number of the update-influenced items of the update-influenced status 193 corresponds to the number of the updated document files. In addition, if the user selects the end button 165, the system is terminated.

This is the end of the description of the first embodiment. The first embodiment offers the following effects. At first, each worker enables to enter and update the document and monitor the status without being conscious of the document out of the charge. The worker is just required to enter and update the document as focusing on the keyword related with the document in charge. When monitoring the status of the document, the worker can get to know the updated document with the document name in charge as the axis. Hence, the worker is not required to manage the document with being conscious of the document out of the charge. Further, the inter-document-update notice can be executed without having to inquire the type of the document file. This makes it possible to know the update of the related document irrespective of the document creating tool to be used by the worker. Further, the present embodiment makes it possible to prevent the return of the document creating work, which has been stated in the Summary of the Invention, and for the worker to freely select the document creating tool.

In turn, the description will be oriented to a variation embodiment of the foregoing first embodiment.

In the actual work, each document template type has a term when the document template type is created. For example, as shown in FIG. 8, the project policy document is created during the system analysis stage, the DB analysis model document and the GUI specification are created during the design stage, and the DB design model document is created during the development stage. When the process enters into the development stage, if the project policy document to be created during the analysis stage is updated, it is often necessary to notice the update to not only the "DB analysis model document" and the "GUI specification" directly related with each other but also the "DB design model document" being created during the development stage. That is, in some cases, it is necessary to execute a process of noticing the document update based on the document creating stage.

Figure 8:
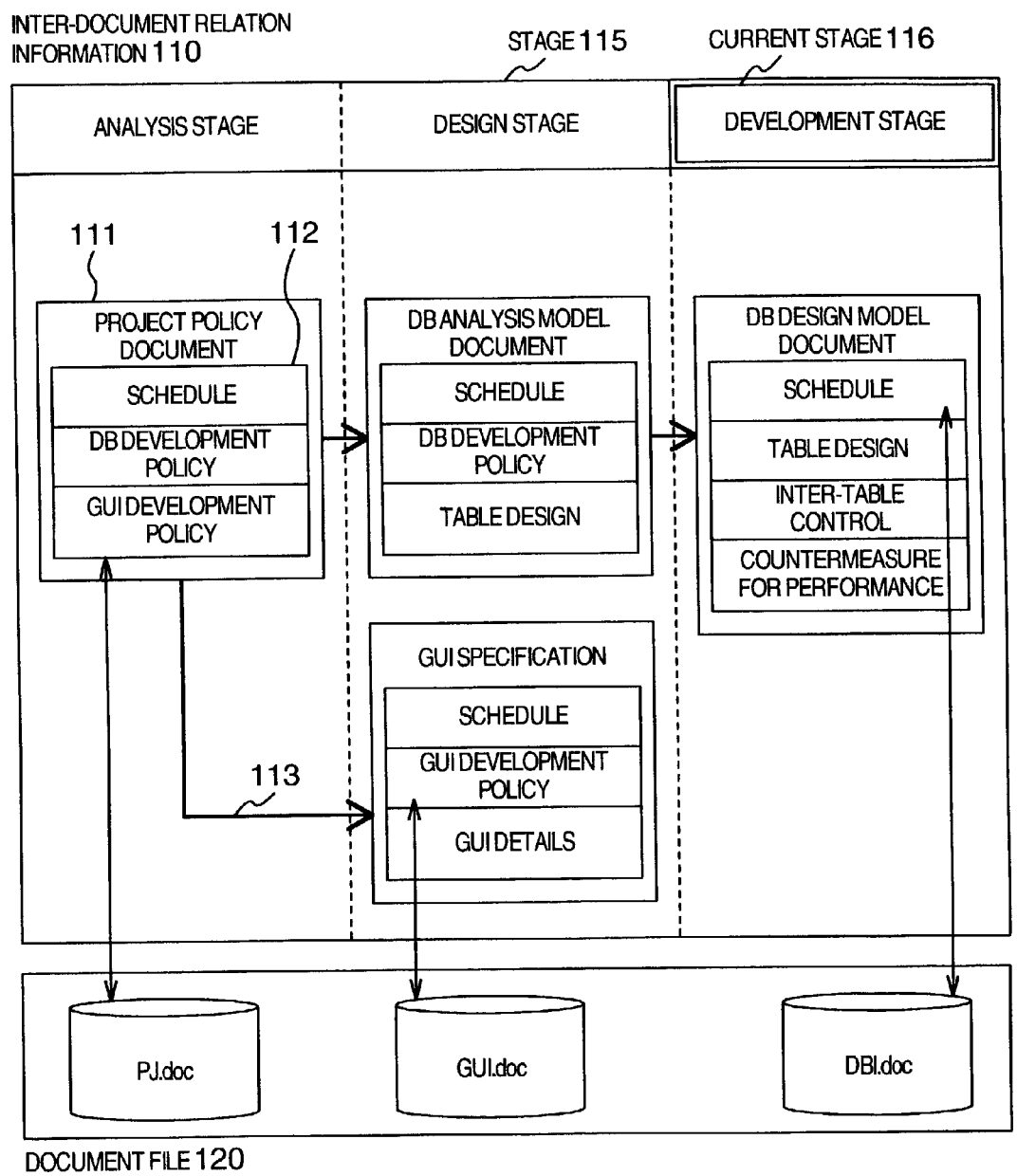
FIG. 8 is a diagram showing inter-document relation information in the second embodiment of the invention.

Then, the description will be oriented to the second embodiment arranged to cope with these problems with reference to FIG. 8. The arrangement of FIG. 8 includes the "stage 115" for managing the document creating stage. The stage, termed herein, means each section of the progressing status of the document creating work, the section being divided on the time sequence. For example, in FIG. 8, the progressing status is sectioned into three stages of "analysis stage", "design stage" and "development stage". One of these stages may be specified as the "current stage" 116 that indicates the current document creating stage. The stages 1 to 3 represent the time sequence of the document creating timing. As the document creating work is progressing, the "current stage 116" is transited to the "analysis stage", the "design stage" and the "development stage" in sequence. The document template type 111 is located so that it may belong to any one of these stages. For example, FIG. 8 shows the "project policy document" is managed as it is related with the "analysis stage".

The "process of noticing the document update based on the document creating stage" is executed to trace the relation among the document templates until the document template type that belongs to the current stage. The similar process as that described above is executed to generate the document-update notice information. Hereafter, the process will be described with reference to the example.

For example, it is assumed that the document file PJ.doc is updated in the case of the current stage=design stage. In this case, the update notice is given only to the document files PJ.doc and GUI.doc.

Next, it is assumed that the document file PJ.doc is updated in the case of the current stage=development stage. In this case, the document template type "DB design model document" is related with the document template type "project policy document" though the relation is indirect. The "DB design model document" is the document template type that belongs to the current stage. Hence, the update notice is given to the document file related with the "DB design model document" as well. That is, in this case, the update notice is given to the document files PJ.doc, GUI.doc and DBI.doc. In other case, when the document fixed in the previous stage is updated in the following stage, for preventing inaccurate interpolation, it may be necessary to execute the process of obtaining the recognition of a boss. In order to improve the problem in this case, the expansion such as control of an input item of the document entry screen according to the current stage state is required to be added to the first embodiment.

The process of the second embodiment may be realized by modifying the process stated in the first embodiment based on the foregoing concept. Hence, the detailed description thereabout is left out.

The second embodiment is intended for improving the problem occurring in the case that the document-update notice is required on the document creating stage.

The first embodiment has been arranged to notice the document update through the use of the relation of the keywords having the same name with each other in a case that the keywords cover different kinds of document template types. If the document template types are different from each other, in actual, another section name may be used for representing each section name (which corresponds to the keyword in this invention) even if the same content is represented. Further, the update for one section of one document may have an influence to a plurality of sections of plural documents.

Figure 9:
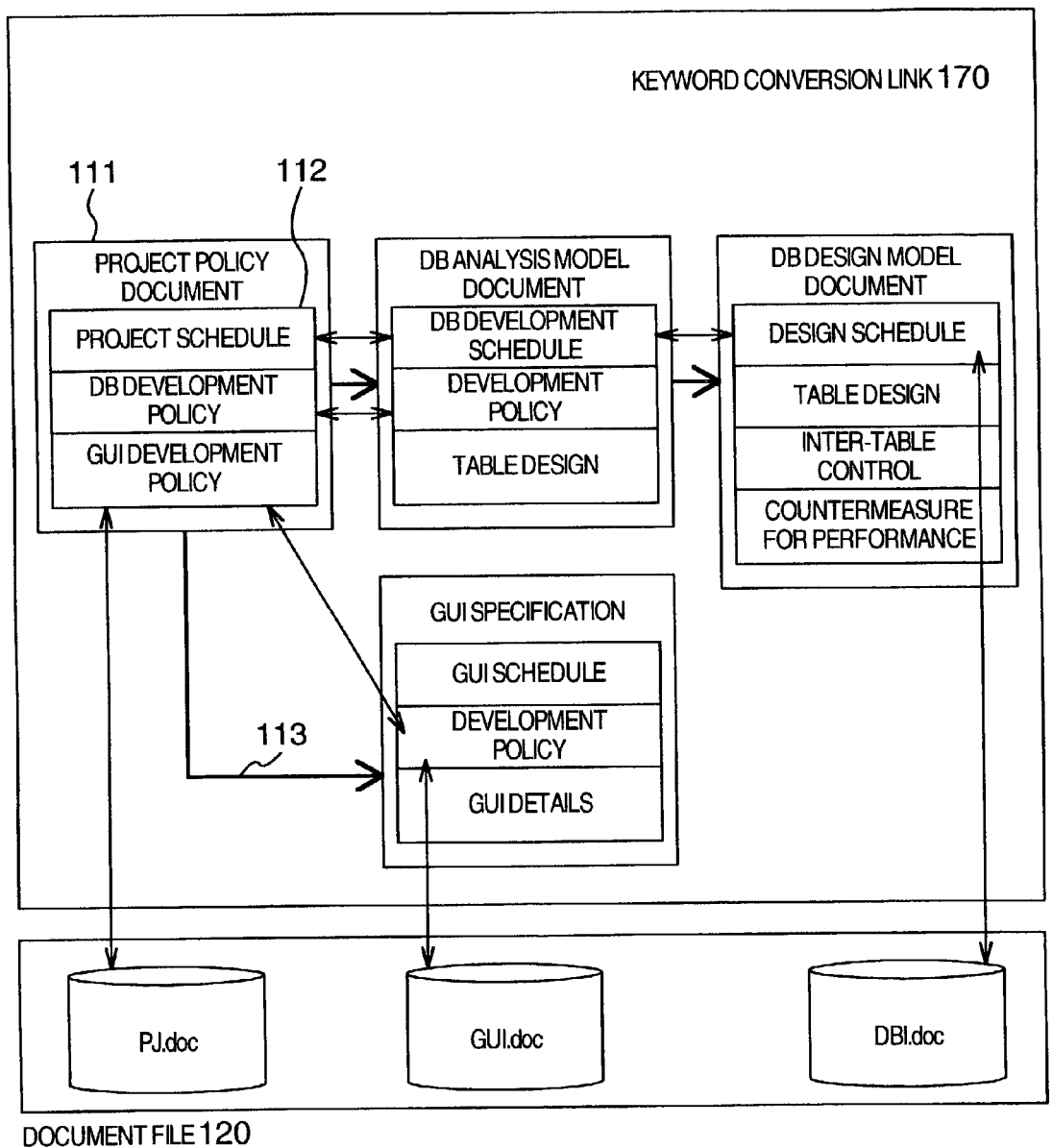
FIG. 9 is a diagram showing inter-document relation information in the third embodiment of the invention.

The third embodiment arranged to solve the foregoing problem will be described with reference to FIG. 9. In FIG. 9, the "keyword conversion link" 117 for linking the keywords with each other is newly added for the purpose of coping with the case that the different keywords are used in the different document template types. As shown in FIG. 9, the module 117 is served to link the "different keywords with the relation of the update notice for each document template type with each other. For example, the keyword "project schedule" in the "project policy document" is linked with the keyword "DB development schedule" in the "DB analysis model document". Unlike the first embodiment, the "keyword conversion link" 117 makes it possible to execute an update notice process between the different keywords. In the case of updating the keyword "project" in the "project policy document", by tracing the keyword conversion link 117, the keyword "DB development schedule" in the influenced "DB analysis model document" is detected. The execution of the following process in the same manner as the first embodiment results in generating the document-update notice information. The linking management between the keywords that have been mentioned with respect to this embodiment serves to improve the problem occurring in the case that the different keywords are used in the different document template types.

As set forth in the paragraph of the prior art, one form of the structured document called the XML document may be referred as a document file. The document management system may utilize the structured document like the XML document as a document file. The prior arts like SGML and XML cannot provide the document file form with flexibility. In order to efficiently proceed the document creating work, it is preferable for the worker to utilize the document creating tool according to his or her intention. The worker prefers to utilize the corresponding document creating tool with his or her condition or skill. However, the prior arts arranged on the structured documents like SGML and XML cannot cope with the request by the worker that "each worker would like to utilize his or her favorite document creating tool" because these prior arts are based on the fixed document template.

In order to cope with this problem, the specially function-intensified embodiment arranged on the XML document will be described below. This document is the fourth one.

Figure 10:
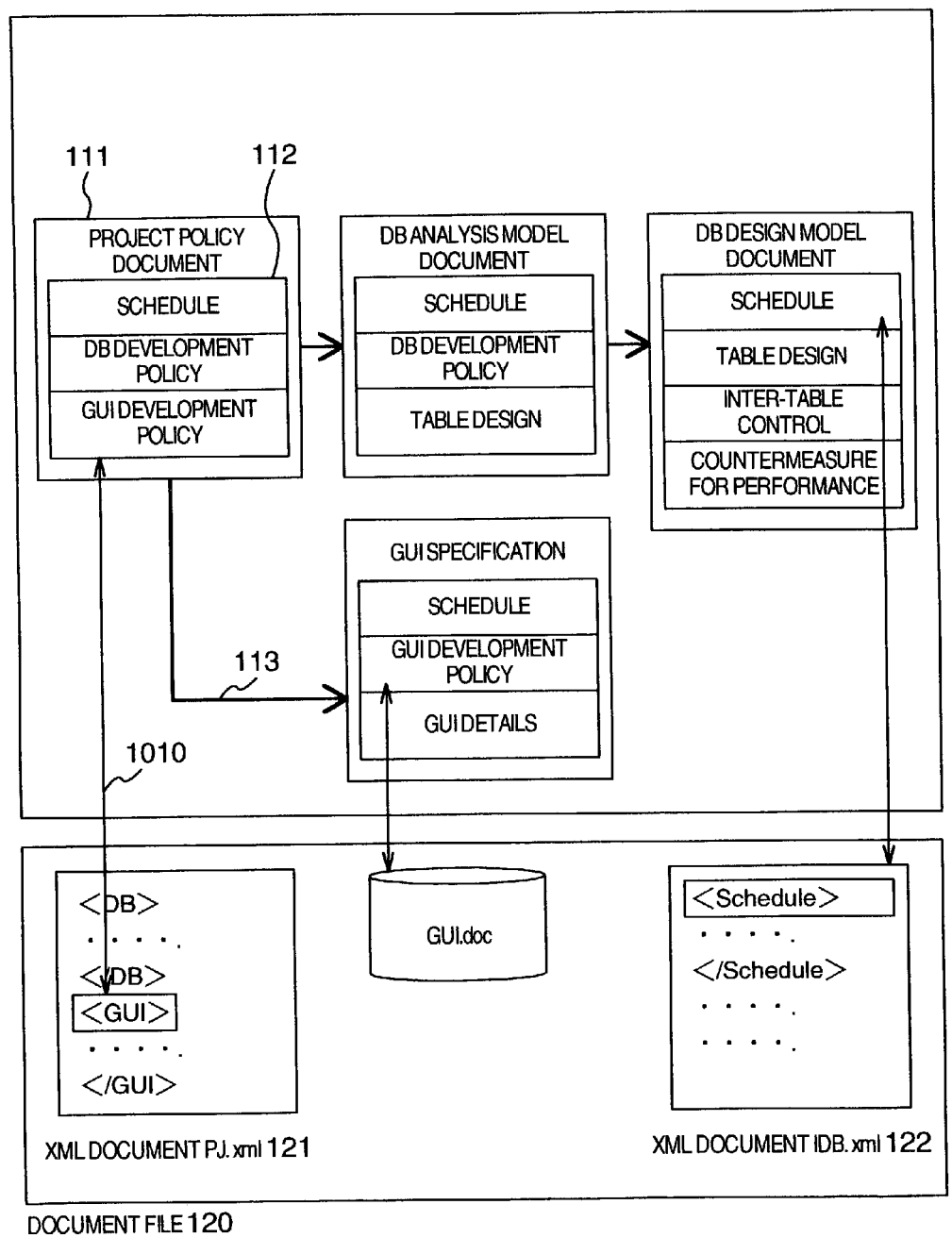
FIG. 10 is a diagram showing inter-document relation information in the fourth embodiment of the invention.

The fourth embodiment will be described with reference to FIG. 10. FIG. 10 shows the document-update notice model 110 realized in the form with the XML document. In FIG. 10, the document file is managed in such a manner that PJ.xml and IDB.xml, which are the XML documents, and GUI.doc, which is another document file rather than XML, are mingled. In a case that the document file to be managed is the XML document, the management covers the link between the document file and the keyword and the link between the tag contained inside the XML document and the keyword. FIG. 10 shows the link between the keyword "GUI development policy" and the tag GUI of PJ.xml through a link 1010.

The use of the link between the tag and the keyword as mentioned above makes it possible to execute the document-update notice process between the XML documents or between the XML document and the non-XML document.

For example, the document-update notice process is executed between PJ.xml 121 and the GUI.doc shown in FIG. 10. This embodiment holds true to the case that PJ.doc of FIG. 1 is updated to PJ.xml 121.

Next, the description will be oriented to the fifth embodiment. The first embodiment uses its own document-update notice screen for noticing the document update. However, it is assumed that the user is burdened with the work of starting the individual system screen. Hence, the fifth embodiment is arranged not to notice the update on the screen of the document managing system but to be associated with the mail management system assumed to be constantly used by the user.

Turning back to FIG. 3, the description will be oriented to the fifth embodiment with the mail management system 360. This embodiment is arranged to newly use the mail transmitting program 1410 on the main storage unit 342. Before noticing the document update by the mail association, the document entry process 160, which has been described in the first embodiment, is executed. Then, the mail transmitting process 1410 is executed to create a mail for each user from the influenced document information 420 (see FIG. 4) and then transmit the mail. When the mail is transmitted, each user's mail address is required. For this purpose, the item of the mail address is added to the user information and then pre-entered.

This embodiment makes it possible to grasp the update status of the document through the electronic mailing system used by the user without having to start the document management system separately.

In the first embodiment, as a document-update notice model, one kind of keyword list is held for each document template type. In the actual work, on the other hand, one kind of document file may be classified in respect of various points.

In order to improve the problem mentioned in the previous paragraph, the sixth embodiment will be proposed for managing and using a plurality of keyword lists. The sixth embodiment will be described in detail. This embodiment is different from the first one in the following respect. As indicated in the inter-document relation information 1110 shown in FIG. 11, in defining the document, this embodiment has a capability of entering a plurality of keyword lists to be used for each document template type. In entering the document, it is possible to select any one of plural keyword lists and to specify an update notice condition for specifying the update notice destination.

Figure 11:
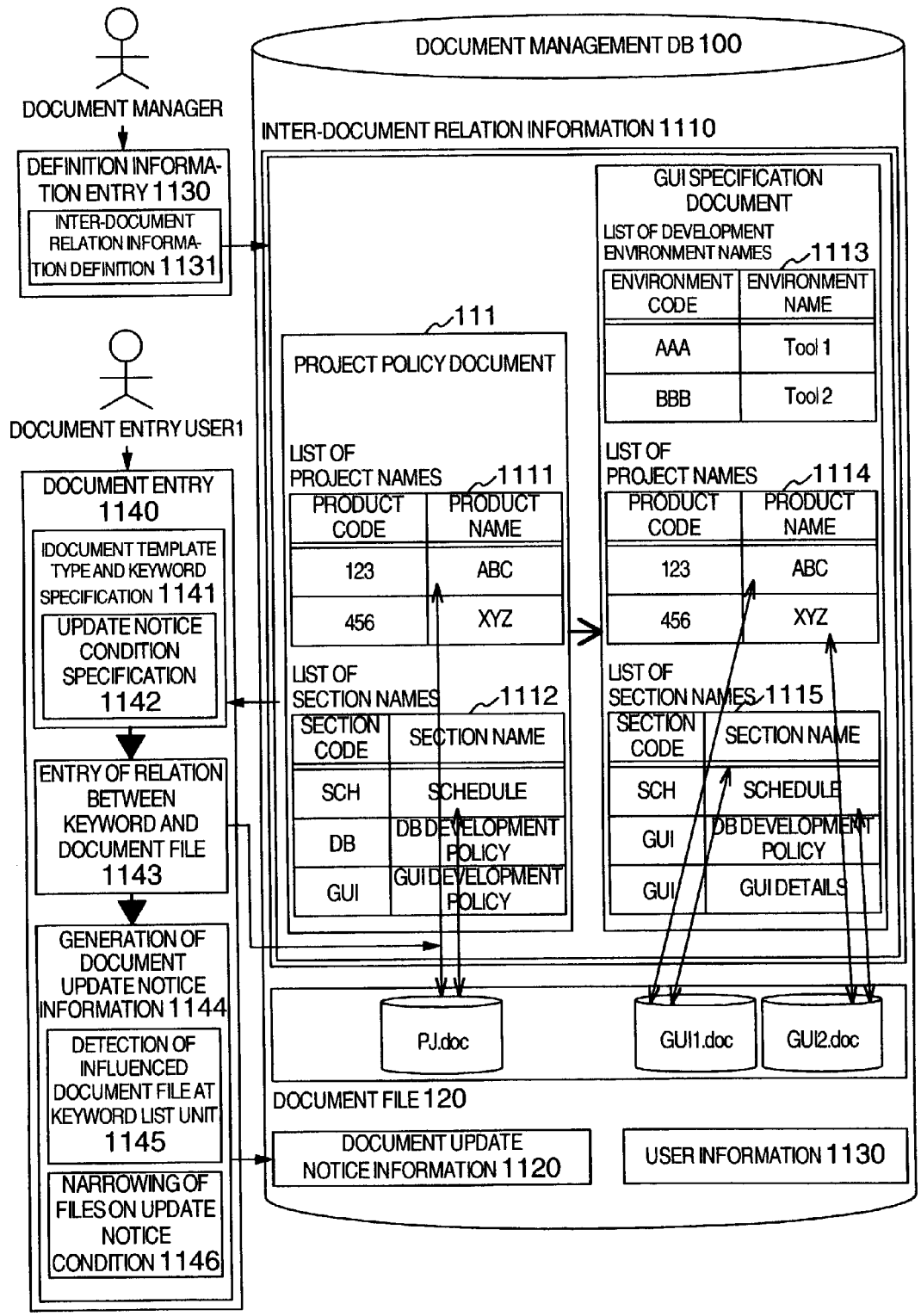
FIG. 11 is a diagram showing a processing operation of the sixth embodiment of the invention.

Hereafter, the description will be oriented to the process to be executed in the sixth embodiment with reference to FIG. 11.

The definition information entry process 1130 is executed to define the inter-document relation information like the first embodiment. The process of defining the inter-document relation information 1131 is executed to perform the different definition of the inter-document relation information 1110 from that of the first embodiment.

The process of defining the inter-document relation information 1131 is executed to manage the inter-document relation information as shown in FIG. 11. This model allows each document template type 111 to have a plurality of keyword lists, in which each keyword list is given an ID name. For example, the "project policy document" includes a product name keyword 1111 and a section name keyword 1112. The "GUI specification" includes a development environment name 1113, a product name keyword 1114, and a section name keyword 1115. Each of these keyword lists includes a plurality of items for classifying the keywords and managing another name of each keyword. For example, the product name keyword 1111 consists of a product code and a product name. This holds true to another keyword list. That is, each keyword list has a plurality of items.

In order to define the keyword list for each document template type, several methods may be proposed. As the first method, as shown in FIG. 11, it is possible to create the keyword lists for each document template type. As another method, an external master may be used. At first, for example, several master like the "section mane keyword master" is provided separately. Then, the necessary date are selected from the master. Next, the relation between the document template type and the record on the master is managed for each document template type.

The document entry process 1140 is executed to perform the entry process on the document entry screen 1150 shown in FIG. 12.

Like the first embodiment, the document template type and keyword specification 1141 is executed to specify the document template type and the document file name. Unlike the first embodiment, the keyword list 1153 shown in FIG. 12 is added to the document entry screen 1150 of the sixth embodiment. The keyword list 1153 of FIG. 12 displays the name of the list table to be used for the keyword specification. Hence, the user can specify the name of the keyword list if necessary. The keyword list based on the specified keyword list name is displayed in the "document template type keyword list" 1154. Then, the selected keywords are added to the "file selection keyword list" 1155 and the "update keyword list" 1156. The "file selection keyword list" 1155 displays the keywords of each keyword list name. The "update keyword list" 1156 displays the keywords over two or more keywords lists. As an example, the keyword lists selected from the product name list and the section list are displayed.

The update notice condition specification 1142 is executed to specify the update notice condition in the update notice condition 1152 shown in FIG. 12. The update notice condition, termed herein, means the keyword list name to be used as a condition in generating the document-update notice information. The logical coupling such as AND or OR may be used for these keyword list names. The update notice condition 1152 shown in FIG. 12 is inputted with the "product name list AND section list". This indicates that the precondition of the document-update notice is the link of the updated document file and the influenced document file with the product name list and the section name list. This will be discussed below with reference to an example.

The relation entry 1143 between the keyword and the document file is executed to enter the relation of each keyword list with the document file. In the example of FIG. 11, the relation of PJ.doc with the product name list 1111 and the section name list 1112 is entered in the document management DB 100.

The generation 1144 of the document-update notice information is executed to create the document-update notice information 1120 based on the condition specified by the update notice condition specification 1142. The generation 1144 of the document-update notice information is executed to perform the processes of "detecting the influenced document files of each keyword list" 1145 and "narrowing the files on the update notice condition" 1146.

The process of detecting an influenced document file for each keyword list 1145 is executed to select candidate influenced document files for each keyword list. Then, based on the rule specified by the update notice condition 1157 of FIG. 12, the process is executed of detecting an influenced document file. In the example of FIG. 11, three kinds of keyword lists are provided as a keyword list, that is, the section name lists 1112, 1115, the production name lists 1111, 1114, and the development environment name list 1113.

Herein, it is assumed that the document update is executed against PJ.doc. As the keyword list thereto, the section name list and the production name list are linked with this document update file. Then, the candidate influenced document files are obtained as remarking these keyword lists.

At first, the process is executed to obtain the candidate influenced document files as remarking the section name list. The updated document file PJ/doc is linked with the section name="schedule" in the section name list 1112. Then, the process is executed to detect the document file related with the section name="schedule" in the section name list 1115 included in the GUI specification. In this instance, GUI1.doc and GUI2.doc are obtained as the candidate influenced document files.

Next, the candidate influenced document files are obtained as remarking the production name list. The updated document file PJ.doc is linked with the keyword ABC in the production name list 1111. Then, the process is executed to detect the document file with the relation of production name="ABC" in the production name list 1114 included in the GUI specification. In this instance, GUI1.doc is obtained as the candidate influenced document file.

Lastly, the process is executed to determine the last influenced document file from the candidate files obtained from each of the keyword list based on the content of the update notice condition 1157 shown in FIG. 12. In the instance shown in FIG. 12, the specified condition is the "product list AND section list". Hence, the candidate files common through AND are determined as the last influenced document file from the candidate files obtained from the keyword lists of the production list and the section name list. In this instance, GUI1.doc is obtained as a candidate file from the product list and GUI1.doc and GUI2.doc are obtained as the candidate files from the section name list. The common file is only the GUI1.doc. Hence, the GUI1.doc is finally obtained as the influenced document file.

The narrowing process 1146 based on the update notice condition is executed to narrow the influenced document file to which the update notice is to be finally given, based on the aforementioned update notice condition. In the instance shown in FIG. 11, the foregoing process is executed to detect GUI1.doc and GUI2.doc as the influenced document file. On the other hand, the update notice condition 1157 shown in FIG. 12 includes the "product name list AND section list" specified thereto. The detected influenced document files are narrowed on the basis of this condition. The influenced document file detected as the influenced document file from both keyword lists like the product name list and the section list is only the GUI1.doc of the GUI1.doc and GUI2.doc. The process of narrowing the files based on the update notice condition" 1146 is executed to generate the influenced document information in the document-update notice information 1120 only against this GUI1.doc. In addition, the document-update notice information 1120 of the sixth embodiment is composed of a table in which the "keyword list name" item is added to the updated document information 410 of the first embodiment and the "influenced keyword list name" item is added to the influenced document information 420.

The foregoing sixth embodiment makes it possible to classify the document files in various points of view and to execute the document-update notice based on this classification.

Further, the combination of the foregoing embodiments may be easily realized on the aforementioned content. For example, the combination of the foregoing embodiments makes it possible to implement the document-update notice method of associating the documents through an electronic mail in noticing the document update and managing the XML document.

As set forth above, the present invention provides a capability of entering and updating a document and monitoring the status of the document without each worker's consciousness of the document out of his or her charge. When entering the document, each worker is just required to be conscious of the keyword related with the document in charge when entering the document. When monitoring the document status, the worker can get to know the updated document with the document name in his or her charge as the axis. It means that the worker is not required to be conscious of any other document rather than the document in his or her charge when managing the document.

Moreover, the inter-document-update notice may be given without having to ask the form of the document file. This makes it possible to know the update of the related document irrespective of the document creating tool to be used by the worker. This also serves to prevent recreation of the document, which has been described in the paragraph of the problems, as well as allow the worker to freely select the document creating tool.

It should be further understood by those skilled in the art that the foregoing description has been made on embodiments of the invention and that various changes and modifications may be made in the invention without departing from the spirit of the invention and the scope of the appended claims.

What is claimed is:

1. A document management method in a document management system including a processor, a memory and display, comprising the steps of:

in a document database memory, as inter-document relation information, managing document files according to document template types and pre-setting a list of a plurality of keywords required for each document file and defining linking relations for an update notice among said keywords, said keywords being independent of said document files;

registering new correlation between a keyword and a document file in said document database memory as said inter-document relation information by specifying a document file name and a document template type and selecting a keyword among a list of keywords set for each document template type displayed on a document entry screen;

on the basis of said inter-document relation information, creating document update notice information comprising updated document information and influenced document information, each being linked with an identification number and storing said document update notice information in said document database memory, said updated document information including a document template type, a document name, a user name of the updated document and a keyword, and said influenced document information including an influenced document template type, an influenced document name, an influenced user name and an influenced keyword;

displaying influenced document files and a state of updated document files according to an entered document name in a document update notice screen on a display; and displaying, upon selection of one of said entered document name, detailed information including an updated document file, a keyword relating to the update and an influenced keyword in said document update notice screen.

2. A document management method as claimed in claim 1 further comprising the steps of managing each time sequence section of a document creating status as a plurality of document creating stages and managing said inter-document relation information linking each of said document creating stages with a document template type, and wherein said step of creating includes a step of changing a range of a document template type to which a document update is to be given according to the state of said document creating stage.

3. A document management method as claimed in claim 1 further comprising the step of managing said inter-document relation information as keyword conversion information as linking the keywords for the document template types with each other and wherein said detecting step includes a step of detecting link between the keywords by using said keyword conversion information.

4. A document management method as claimed in claim 1 wherein said step of linking said keyword selected with said document file includes a step of relating a tag name held inside of a structured document file with the keyword.

5. A document management method as claimed in claim 1 further comprising a step of transmitting a message having an influenced document file name through an electronic mail.

6. A document management method as claimed in claim 1 wherein said step of linking said keyword selected with the document file includes a step of linking the document files with a list of a plurality of keywords.

7. A document management system, comprising:
a CPU;
a display; and
a memory system comprising, as inter-document relation information, document files which are managed according to document template types, a predetermined list of a plurality of keywords required for each document file, and information indication linking relations for an update notice among said keywords, wherein said keywords are independent of said document files;

means for registering a new correlation between a keyword and a document file in said document database as said inter-document relation information by specifying a document file name and a document template type and selecting a keyword among a list of keywords set for each document template type displayed on a document entry screen; and means for creating, based on said inter-document relation information, document update notice information comprising updated document information and influenced document information which are linked with an identification number and stored in said document database as said inter-document relation information, wherein said updated document information includes a document template type, a document name, a user name of the updated document and a keyword, and said influenced document information includes an influenced document template type, an influenced document name, an influenced user name and an influenced keyword, wherein said display comprises a document update notice screen in which influenced document files and state of updated document files according to entry document name are displayed, and upon selection of one of said entry document name, detailed information including an updated document file, a keyword relating to the update and an influenced keyword are further displayed.

8. A computer-readable recording medium storing a document management program by which a CPU executes the steps of:

storing in a document database memory, as inter-document relation information, managing document files according to document template types and pre-setting a list of a plurality of keywords required for each document file and defining linking relations for an update notice among said keywords, said keyword being independent of said document files;

registering new correlation between a keyword and a document file in said document database memory as said inter-document relation information by specifying a document file name and a document template type and selecting a keyword among a list of keywords set for each document template type in a document entry screen displayed on said display;

on the basis of said inter-document relation information, creating document update notice information comprising updated document information and influenced document information, each being linked with an identification number and storing said document update notice information in said document database memory, said updated document information including a document template type, a document name, a user name of the updated document and a keyword, and said influenced document template type, an influenced document template type, an influenced user name and an influenced keyword;

displaying influenced document files and a state of updated document files according to an entered document name in a document update notice screen displayed on a display; and displaying, upon selection of one of said entered document name, detailed information including an updated document file, a keyword relating to the update and an influenced keyword in said document update notice screen.

* * * * *